Patented Feb. 20, 1951

2,542,831

UNITED STATES PATENT OFFICE 2,542,831

MINERAL OIL COMPOSITION AND IMPROVING AGENT THEREFOR

Edward A. Oberright, Woodbury, N. J., assignor to Socony-Vacuum Oil Company, Incorporated, a corporation of New York No Drawing. Application October 23, 1945, Serial No. 624,097

12 Claims. (Cl. 252—42.7)

This invention has to do with the stabilization of petroleum products against the harmful effects of oxidation and deterioration with use. More specifically, it has to do with the improvement or stabilization of mineral oil fractions, particularly viscous mineral oils, by the use of novel reaction products, or a novel class of reaction products, which when admixed with a mineral oil in minor proportions will prevent or delay undesirable changes taking place in the oil.

It is well known to those familiar with the art that substantially all of the various fractions obtained from mineral oils and refined for their various uses are susceptible to oxidation. This susceptibility of an oil fraction to oxidation and the manner in which oxidation manifests itself within the oil varies with the type and degree of refinement to which the oil has been subjected and with the conditions under which the oil is used or tested. In other words, the deleterious products formed in an oil fraction as a result of oxidation and the degree to which they are formed depends upon the extent to which the various unstable constituents, which may act as oxidation catalysts, have been removed by refining operations, and also upon the conditions of use.

In recent years a great many materials containing one or more characterizing chemical elements have been proposed for use as fortifying or stabilizing agents for petroleum products. Materials containing halogen, metalloid or metals, or combinations of one or more such elements, have been credited with improving petroleum products in certain respects. For example, various sulfur-containing materials have been proposed for this purpose.

This invention relates to sulfur-containing and sulfur- and metal-containing compounds possessed of the capacity to effect improvement of mineral oil fractions. More particularly, the present invention is predicated upon the discovery of a new and novel class of oil-soluble compounds represented by the following general formula:

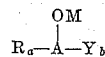

wherein A represents an aromatic nucleus; M is selected from the group consisting of hydrogen and metal; R is selected from the group consisting of hydrogen and a hydrocarbon group; $a$ represents the number of R groups attached to the aromatic nucleus A and is an integer of at least one; Y is selected from the group consisting of a sulfo-alkenyl, a seleno-alkenyl and a telluro-alkenyl group; and $b$ represents the number of Y groups attached to the aromatic nucleus A and is an integer of at least one.

The aromatic nucleus A may be mono- or polycyclic and is typified by phenyl, naphthyl, anthranyl, etc. As indicated by the foregoing general formula, and as further described hereinafter, compounds of this invention may be derived from a hydroxyaromatic compound having an aromatic nucleus A. Representative hydroxyaromatic compounds which may be used in preparing the compounds contemplated herein are: phenol, catechol, resorcinol, hydroquinone, pyrogallol, guiacol, α- and β-naphthol, anthranol, etc.

As is further indicated by the foregoing general formula, the aromatic nucleus (A) may be characterized by one or more hydrocarbon groups (R) or may only have hydrogen atoms attached to the carbon atoms of said nucleus. These hydrocarbon groups may be alkyl, aralkyl, alkaryl, cycloalkyl or aryl in nature, all but the latter group, aryl, generally contributing to increasing the oil solubility of the final compounds. By way of illustration, R groups include ethyl, amyl, hexyl, keryl (derived from kerosene hydrocarbon fractions), paraffin wax, phenyl, phenyl ethyl, ethylphenyl, cyclohexyl, and the like. The term "paraffin wax" as used herein designates petroleum wax, or aliphatic hydrocarbons or hydrocarbon groups of the type which characterize petroleum wax. These so-called "paraffin wax" substituents may be obtained by alkylation of a hydroxy-aromatic compound with a relatively high molecular weight aliphatic hydrocarbon or a mixture of such hydrocarbons (such as petroleum wax) by any suitable alkylation procedure such, for example, as by a Friedel-Crafts condensation of a chlorinated petroleum wax with phenol to form paraffin wax-phenol.

The compounds represented above by the general formula are characterized by the presence therein of a sulfo-, seleno- or telluro- alkenyl group, which group is formed by reaction of sulfur, selenium or tellurium, respectively, with an olefinic (>C=C<) group of an alkenyl group. Preferably, one to three such groups are present in the compounds of this invention. Typical alkenyl groups are propenyl, butenyl, hexenyl, crotonyl, etc.

As indicated hereinabove, the compounds may also contain metal, in which case the compounds so characterized are metal phenates. Any metal may be used the oxide or hydroxide of which (in alcoholic solution, if necessary) can be reacted with a hydroxyaromatic compound, or a salt of which can be reacted in alcohol solution with the sodium salt of a hydroxyaromatic compound. For example, the said sodium salt can be reacted with an alcohol solution of a salt of the desired metal, such as stannous chloride, lead acetate, thorium nitrate, titanium tetrachloride, etc. Among the metals contemplated for this purpose are: copper, beryllium, magnesium, calcium, strontium, barium, zinc, cadmium, mercury, germanium, tin, lead, vanadium, chromium, manganese, iron, cobalt, nickel, ruthenium, palladium, platinum, aluminum, antimony, arsenic, bismuth, cerium, columbium, gallium, gold, iridium, indium, molybdenum, osmium, rubidium, selenium, tantalum, tellurium, thorium, titanium, tungsten, uranium and zirconium. Preference is given to metals of the alkaline earth group, particularly to barium.

In addition to the aforesaid R, Y, OH and OM characterizing groups, the aromatic nucleus (A) may also have attached thereto one or more such characterizing groups as amino, nitro, carboxy, carbonyl, hydroxylamine and the like. It will be apparent, of course, that the number of such groups which may be attached to the aromatic nucleus will be dependent upon the number of nuclear carbon atoms not having attached thereto R, Y, OH or OM groups.

The compounds of this invention may be prepared by any one of several procedures known to the chemical art. They may be prepared by reacting sulfur, for example, with an alkenyl phenyl ether, whereupon the alkenyl group is sulfurized and the sulfurized alkenyl group so formed rearranges to the nucleus, thus forming a sulfo-alkenyl phenol. Rearrangement is demonstrated by the absence of hydrogen sulfide development during the reaction. A preferred procedure involves reacting about one gram atom of sulfur with one molar proportion of an alkenyl phenyl ether at 150–250° C. for such time as to obtain a product non-corrosive to a copper strip when such a strip is placed in a one per cent blend of said product in oil, and the oil blend is heated for three hours at 100° C. The alkenyl aryl ethers used in preparing the compounds contemplated herein may be prepared by reacting an alkenyl halide with a phenol in the presence of sodium alcoholate in alcohol solution, or of potassium carbonate in acetone, or of sodium carbonate in water; they may also be prepared by reacting phenol with an olefinic alcohol, such as allyl alcohol, or with an olefinic acetate, such as allyl acetate, in the presence of sulfuric acid.

Another method of preparation involves rearrangement of the alkenyl group of an alkenyl aryl ether to the aryl nucleus, followed by reaction of the rearranged compound, namely, an alkenyl-substituted aryl hydroxyaromatic compound, with sulfur, selenium or tellurium. This rearrangement may be affected by heating the ether at a temperature slightly in excess of its boiling point, alone or in the presence of diethylaniline; or heating the said ether at reflux over a relatively long period of time with a dilute sulfuric acid-acetic acid mixture. Other typical methods of preparation include sulfurizing, for example, alkenyl hydroxyaromatic compounds formed by: reacting an unsaturated aldehyde with a phenol; reacting a phenol with 2-methyl cyclohexanone in the presence of hydrochloric acid; chlorination of an alkyl group of an alkyl phenol followed by dehydrohalogenation; etc.

The preparation of the compounds of this invention by methods such as the foregoing may be carried out in the presence of substantially inert diluents such, for example, as benzene, chlorbenzene, tetrachlorethane, mineral oil, etc. In the event that mineral oil is used as a diluent, the mineral oil may be retained, rather than separated from the final compound, thereby providing a mineral oil concentrate.

The compounds of this invention and methods of preparation thereof are illustrated below by the following typical examples.

EXAMPLE I

Diamyl sulfo-methallyl phenol

Sodium diamyl phenate was prepared by gradually adding small pieces of sodium (total quantity 11.5 grams; 0.5 mol) to a mixture of diamyl phenol (117 grams; 0.5 mol) and butyl alcohol. Methallyl chloride (70 grams, 50% excess; 0.75 mol) was then added dropwise to the sodium diamyl phenate at 100° C., and the resulting mixture was refluxed at 110–120° C. for eleven hours. Thereafter, the mixture was washed with water to remove sodium chloride formed in the reaction of methallyl chloride and the said phenate. Butyl alcohol and any unreacted methallyl chloride were removed from the water-washed mixture by distilling the latter to a maximum temperature of 175° C. at 15 mms. pressure. The product, predominantly diamylphenyl methallylether, had a hydroxyl value of 44 (theoretical=0) and an iodine value of 89 (theoretical=88). The hydroxyl value is due to unreacted diamyl phenol or to rearrangement of the methallyl group to the nucleus.

Fifty grams of diamylphenyl methallylether, prepared as described above, was heated to 175° C. and 4 grams of sulfur (80 per cent of theoretical) were slowly added thereto. The reaction mixture so obtained was heated for two hours at 175° C. and was filtered through paper. The product, diamyl sulfomethallyl phenol, contained 8.6 per cent sulfur and had a hydroxyl value of 163; corresponding theoretical values are 10 per cent and 175.

EXAMPLE II

Barium phenate of diamyl sulfo-methallyl phenol

A mixture of 12 grams of diamyl sulfo-methallyl phenol (prepared as indicated in Example I above), 2.4 grams of barium (59 grams of 4 per cent barium butylate solution) and 24 grams of mineral oil was refluxed for two hours. Butyl alcohol was removed from the reaction mixture by distilling the latter to a maximum temperature of 150° C. at 15 mms. pressure, and the alcohol-free product was filtered through a filter aid (Hi-Flo clay). The product, barium phenate of diamyl sulfo-methallyl phenol, in the oil blend in which it was made analyzed 3.8 per cent barium and 2.5 per cent sulfur. On a concentrate basis, this corresponds to 11.2 per cent barium and 7.5 per cent sulfur.

EXAMPLE III

Paraffin wax-phenyl sulfo-methallyl phenol

Sodium paraffin wax phenate was made by gradually adding 3.7 grams of sodium metal to 100 grams of paraffin wax phenol (2–12) in butanol, the latter acting as a solvent. The said phenate was heated to 90° C. and 28.8 grams of methallyl chloride were slowly added thereto over a period of 15 minutes. The reaction mixture so formed was heated at 90° C. for 6 hours, cooled, water washed, and distilled to a maximum temperature of 175° C. at 15 mms. pressure, whereupon paraffin wax-phenyl methallyl ether (2-12) was obtained. The paraffin wax-phenol (2-12) used in this example was prepared by the usual Friedel-Crafts procedure outlined in Patent No. 2,353,491, issued July 11, 1944.

Ninety-five grams of paraffin wax-phenyl methallyl ether (2-12), prepared as described above, was heated to 185° C. and 2.8 grams of sulfur were added thereto during a 10 minute period. The resulting reaction mixture was heated at 185° C. for 5 hours. Thereafter, the mixture was cooled, diluted with benzol and filtered. The filtrate thus obtained was distilled at a maximum temperature of 150° C. at 15 mms. pressure whereupon benzol was removed. The product is paraffin wax-phenyl sulfo-methallyl phenol (2-12).

EXAMPLE IV

Barium oxide in methyl alcohol, 8.3 grams of barium as barium oxide, was slowly added to 95 grams of paraffin wax-phenyl sulfo-methallyl phenol (2-12), prepared as described in Example III above, in 190 grams of mineral oil at 75° C. Methyl alcohol was distilled from the reaction mixture obtained during the addition and complete removal thereof was insured by raising the temperature of the reaction mixture to 150° C. The reaction mixture so obtained was cooled and benzol was added thereto. The benzol mixture was then filtered through Hi-Flo and benzol was removed from the filtrate by distilling the latter to a maximum temperature of 175° C. at 15 mms. pressure. The product, barium phenate of paraffin wax-phenyl sulfo-methallyl phenol (2-12), contained 4.0 per cent barium and 1.9 per cent sulfur on a concentrate basis.

As indicated hereinabove, the compounds contemplated by this invention and illustrated by the foregoing examples, when added to mineral oils in minor proportions have been found to improve these oils in several important respects. This phenomenon is demonstrated in the following tables, which contain results of the various tests conducted to determine the effectiveness of these compounds as addition agents for lubricating oils. The per cent of compound added to the oil in each table is the per cent of compound per se and does not include the oil in which the compound was made.

CORROSION INHIBITION

Motor oils, especially those refined by certain solvent-extraction methods, tend to oxidize when submitted to high temperatures and to form products that are corrosive to metal bearings. This corrosive action may be quite severe with certain bearings, such as those having the corrosion-susceptibility of cadmium-silver alloys; and may cause their failure within a comparatively short time. The following test was used to determine the corrosive action of motor oil on an automobile connecting rod bearing.

The oil used consisted of Pennsylvania neutral and residuum stock separately refined by means of chlorex and then blended to give an S. A. E. 20 motor oil with a specific gravity of 0.872, a flash point of 435° F., and a Saybolt Universal viscosity of 318 seconds at 100° F. The oil was tested by adding a section of a bearing containing a cadmium-silver alloy surface, weighing about 6 grams, and heating it to 175° C. for 22 hours while a stream of air was bubbled against the surface of the bearing. The loss in weight of the bearing during this treatment measures the amount of corrosion that has taken place. A sample of the oil containing a stabilizing agent was run at the same time as a sample of the straight oil, and the loss in weight of the bearing section in the inhibited oil can thus be compared directly with the loss of the section in the uninhibited oil. The results obtained in this test are set forth in Table I below:

Table I

| Stabilizing Agent | Conc. (Weight Per Cent) | Mgms. Loss in Weight | |
|---|---|---|---|
| | | Inhibited | Uninhibited |
| Diamyl sulfo-methallyl phenol | 2.0 | 5 | 44 |
| Barium phenate of diamyl sulfo-allyl phenol | 1/16 | 0 | 27 |
| Barium phenate of paraffin wax sulfo-methallyl phenol | 1/8 | 0 | 22 |

ACCELERATED CORROSION TEST

This test is used to determine the corrosive nature of lubricating oils under simulated operating conditions. The apparatus used consists of a circulating arrangement whereby oil at 325° F., under a pressure of 10 pounds per square inch, is sprayed against a standard cadmium-nickel bearing for a period of 5 hours. The amount of oil under constant circulation in the system is 1500 cc. In passing through the system, the oil comes in contact with cast iron, steel, stainless steel, copper, and the aforesaid cadmium-nickel bearing, and is also exposed to aeration. The oil used in this test contains a small amount of an accelerator, namely, iron naphthenate (commercially designated as Nuodex,, 6 per cent $Fe_2O_3$) which greatly increases the rate of oxidation of the oil. The degree of oxidation suffered by the oil is shown by the development of acidity therein as measured by the neutralization number (N. N.), the loss in weight in grams of the cadmium-nickel bearing and the percentage of viscosity increase.

The specific base oil used in this test was a solvent refined oil having a Saybolt Universal viscosity (S. U. V.) of 65 seconds at 210° F. and containing 0.17 per cent of Nuodex; and the oil blends contained small amounts of typical compounds in the base oil. The results of these tests are set forth in Table II shown below:

Table II

| Stabilizing Agent | Conc. (Weight Per Cent) | N. N. | Per Cent Viscosity Incr. | Loss in grams of Cd-Ni bearing |
|---|---|---|---|---|
| None | | 7.8 | 107 | 1.695 |
| Diamyl sulfo-methallyl phenol | 2.0 | 5.2 | 50 | 0.056 |
| Barium phenate of diamyl sulfo-allyl phenol | 1.0 | 3.8 | 31 | 0.822 |

LAUSON ENGINE TEST

To further demonstrate the effectiveness of the compounds contemplated herein as petroleum oil stabilizers, blank oils and blends of said oils and typical compounds were subjected to Lauson engine tests. In this test, a single cylinder Lauson engine was run with an oil temperature of 290° F. and a jacket temperature of 212° F. The oil used was an S. A. E. motor oil, solvent refined. The neutralization number (N. N.) and viscosity, in centistokes at 210°

F. of the oil and oil blend, were determined after 36 hours. The results are shown below in Table III.

*Table III*

| Stabilizing Agent | Conc. (Weight Per Cent) | N. N. | K. V. @ 210° F |
|---|---|---|---|
| *16-hour test* | | | |
| None | | 4.8 | 50.4 |
| Diamyl sulfo-methallyl phenol | 1.0 | 2.9 | 47.8 |
| None | | 5.8 | 53.7 |
| Barium phenate of diamyl sulfo-methallyl phenol | 0.5 | 1.7 | 46.4 |
| *36-hour test* | | | |
| None | | 7.0 | 51.3 |
| Barium phenate of diamyl sulfo-allyl phenol | 1.0 | 2.7 | 48.9 |
| None | | 6.2 | 52.5 |
| Barium phenate of paraffin wax sulfo-methallyl phenol | 1.0 | 4.5 | 51.5 |

It will be apparent from the foregoing representative test data that the compounds of this invention are effective oil stabilizing agents.

The amount of stabilizing agent used varies with the mineral oil fraction with which it is blended and with the properties desired in the final oil composition. These condensation products may be added to mineral oil in amounts of from about 0.01 per cent to about 5.0 per cent, but amounts of the order of 1.0 generally provide satisfactory improvement.

It is to be understood that although I have described certain preferred compounds and procedures which may be followed in the preparation of the same, such compounds and procedures are illustrative only. Accordingly, this invention is not to be considered limited thereto or thereby, but is to be broadly construed in the light of the language of the appended claims.

I claim:

1. A mineral oil composition comprising a major proportion of a viscous mineral oil fraction having in admixture therewith a minor proportion, sufficient to stabilize said oil fraction, of a compound represented by the general formula:

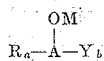

wherein A represents a carbocyclic aromatic nucleus; M is selected from the group consisting of hydrogen and metal; R is a saturated aliphatic hydrocarbon group; $a$ represents the number of R groups attached to the aromatic nucleus A and is an integer of at least one; Y is an alkenyl radical, the olefinic bond of which has been satisfied by the addition of a sulfur atom thereto; and $b$ represents the number of Y groups attached to the aromatic nucleus A and is an integer of at least one.

2. A mineral oil composition comprising a major proportion of a viscous mineral oil fraction having in admixture therewith a minor proportion, from about 0.01 per cent to about 5.0 per cent, of a compound represented by the general formula:

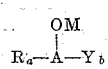

wherein A represents a carbocyclic aromatic nucleus; M is selected from the group consisting of hydrogen and metal; R is a saturated aliphatic hydrocarbon group; $a$ represents the number of R groups attached to the aromatic nucleus A and is an integer of at least one; Y is an alkenyl radical, the olefinic bond of which has been satisfied by the addition of a sulfur atom thereto; and $b$ represents the number of Y groups attached to the aromatic nucleus A and is an integer of at least one.

3. A mineral oil composition comprising a major proportion of a viscous mineral oil fraction having in admixture therewith a minor proportion, sufficient to stabilize said oil fraction, of a compound represented by the general formula:

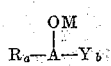

wherein A represents a carbocyclic aromatic nucleus; M is selected from the group consisting of hydrogen and metal; R is a saturated aliphatic hydrocarbon group; $a$ represents the number of R groups attached to the aromatic nucleus A and is an integer from 1 to 4; Y represents an alkenyl radical, the olefinic bond of which has been satisfied by the addition of a sulfur atom thereto; and $b$ represents the number of Y groups attached to the aromatic nucleus A and is an integer from 1 to 3.

4. A mineral oil composition comprising a major proportion of a viscous mineral oil fraction having in admixture therewith a minor proportion, sufficient to stabilize said oil fraction, of a compound represented by the general formula:

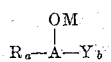

wherein A represents a carbocyclic aromatic nucleus, M is selected from the group consisting of hydrogen and metal; R is a saturated aliphatic hydrocarbon group; $a$ represents the number of R groups attached to the aromatic nucleus A and is an integer from 1 to 4; Y represents an alkenyl radical, the olefinic bond of which has been satisfied by the addition of a sulfur atom thereto; $b$ represents the number of Y groups attached to the aromatic nucleus A and is an integer from 1 to 3, and the sum of $a$ and $b$ is not more than 5.

5. A mineral oil composition comprising a major proportion of a viscous mineral oil fraction having in admixture therewith a minor proportion, sufficient to stabilize said oil fraction, of a compound represented by the general formula:

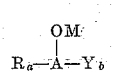

wherein A represents a phenyl group, M is selected from the group consisting of hydrogen and metal; R is a saturated aliphatic hydrocarbon group; $a$ represents the number of R groups attached to the aromatic nucleus A and is an integer from 1 to 4; Y represents an alkenyl radical, the olefinic bond of which has been satisfied by the addition of a sulfur atom thereto; and $b$ represents the number of Y groups attached to the aromatic nucleus A and is an integer from 1 to 3.

6. A mineral oil composition comprising a major proportion of a viscous mineral oil fraction having in admixture therewith a minor proportion, sufficient to stabilize said oil fraction, of a compound represented by the general formula:

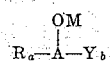

wherein A represents a carbocyclic aromatic nucleus; M is selected from the group consisting of hydrogen and metal; R is a saturated aliphatic hydrocarbon group; $a$ represents the number of R groups attached to the aromatic nucleus A and is an integer from 1 to 4; Y represents an allyl radical, the olefinic bond of which has been satisfied by the addition of a sulfur atom thereto; and $b$ represents the number of Y groups attached to the aromatic nucleus A and is an integer from 1 to 3.

7. A mineral oil composition comprising a major proportion of a viscous mineral oil fraction having in admixture therewith a minor proportion, sufficient to stabilize said oil fraction, of a compound represented by the general formula:

$$R_a-\underset{\underset{\text{OM}}{|}}{A}-Y_b$$

wherein A represents a carbocyclic aromatic nucleus; M is selected from the group consisting of hydrogen and metal; R is a saturated aliphatic hydrocarbon group; $a$ represents the number of R groups attached to the aromatic nucleus A and is an integer from 1 to 4; Y represents a methallyl radical, the olefinic bond of which has been satisfied by the addition of a sulfur atom thereto; and $b$ represents the number of Y groups attached to the aromatic nucleus A and is an integer from 1 to 3.

8. A mineral oil composition comprising a major proportion of a viscous mineral oil fraction having in admixture therewith a minor proportion, sufficient to stabilize said oil fraction, of a compound represented by the general formula:

$$R_a-\underset{\underset{\text{OM}}{|}}{A}-Y_b$$

wherein A represents a carbocyclic aromatic nucleus, M is metal; R is a saturated aliphatic hydrocarbon group; $a$ represents the number of R groups attached to the aromatic nucleus A and is an integer from 1 to 4; Y represents an alkenyl radical, the olefinic bond of which has been satisfied by the addition of a sulfur atom thereto; and $b$ represents the number of Y groups attached to the aromatic nucleus A and is an integer from 1 to 3.

9. A mineral oil composition comprising a major proportion of a viscous mineral oil fraction having in admixture therewith a minor proportion, sufficient to stabilize said oil fraction, of a compound represented by the general formula:

$$R_a-\underset{\underset{\text{OH}}{|}}{A}-Y_b$$

wherein A represents a carbocyclic aromatic nucleus, R is a saturated aliphatic hydrocarbon group; $a$ represents the number of R groups attached to the aromatic nucleus A and is an integer from 1 to 4; Y represents an alkenyl radical, the olefinic bond of which has been satisfied by the addition of a sulfur atom thereto; and $b$ represents the number of Y groups attached to the aromatic nucleus A and is an integer from 1 to 3.

10. A mineral oil composition comprising a major proportion of a viscous mineral oil fraction having in admixture therewith a minor proportion, sufficient to stabilize said oil fraction of diamyl methallyl phenol, the olefinic bond of the methallyl radical having been satisfied by the addition of a sulfur atom thereto.

11. A mineral oil composition comprising a major proportion of a viscous mineral oil fraction having in admixture therewith a minor proportion, sufficient to stabilize said oil fraction, of barium phenate of diamyl allyl phenol, the olefinic bond of the allyl radical having been satisfied by the addition of a sulfur atom thereto.

12. A mineral oil composition comprising a major proportion of a viscous mineral oil fraction having in admixture therewith a minor proportion, sufficient to stabilize said oil fraction, of barium phenate of paraffin wax methallyl phenol, the olefinic bond of the methallyl radical having been satisfied by the addition of a sulfur atom thereto.

EDWARD A. OBERRIGHT.

REFERENCES CITED

The following references are of record in the file of this patent:

UNITED STATES PATENTS

| Number | Name | Date |
|---|---|---|
| 1,836,400 | Ruppert | Dec. 15, 1931 |
| 2,125,411 | Wilson | Aug. 2, 1938 |
| 2,134,346 | Seifert | Oct. 25, 1938 |
| 2,159,381 | Jochum et al. | May 23, 1939 |
| 2,168,181 | Ulrich et al. | Aug. 1, 1941 |
| 2,240,957 | Munz | May 6, 1941 |
| 2,379,313 | May | June 26, 1944 |
| 2,361,051 | Patterson | Oct. 24, 1944 |
| 2,362,289 | Mikeska | Nov. 7, 1944 |
| 2,388,074 | Patterson | Oct. 30, 1945 |

FOREIGN PATENTS

| Number | Country | Date |
|---|---|---|
| 408,708 | Great Britain | 1934 |
| 461,328 | Great Britain | Feb. 15, 1937 |
| 470,494 | Great Britain | Aug. 12, 1937 |